(12) United States Patent
Kulkarni et al.

(10) Patent No.: US 10,972,943 B2
(45) Date of Patent: Apr. 6, 2021

(54) SMART CHANNEL SELECTION FOR LOW BANDWIDTH IOT CLIENTS

(71) Applicant: Cisco Technology, Inc., San Jose, CA (US)

(72) Inventors: Santosh Babaji Kulkarni, San Jose, CA (US); Vishal Satyendra Desai, San Jose, CA (US); Pooya Monajemi, Irvine, CA (US); Young Il Choi, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 102 days.

(21) Appl. No.: 16/296,523

(22) Filed: Mar. 8, 2019

(65) Prior Publication Data

US 2020/0288353 A1   Sep. 10, 2020

(51) Int. Cl.
*H04W 28/26* (2009.01)
*H04W 28/18* (2009.01)

(52) U.S. Cl.
CPC ........... *H04W 28/26* (2013.01); *H04W 28/18* (2013.01)

(58) Field of Classification Search
CPC .............................. H04W 28/26; H04W 28/18
See application file for complete search history.

(56) References Cited

U.S. PATENT DOCUMENTS

| 9,060,352 B2 | 6/2015 | Chan et al. |
| 2008/0039089 A1 | 2/2008 | Berkman et al. |
| 2012/0170526 A1 | 7/2012 | Wei |
| 2014/0098748 A1* | 4/2014 | Chan ............... H04W 72/082 370/329 |
| 2014/0269280 A1* | 9/2014 | Bhanage ......... H04W 72/0486 370/230 |
| 2015/0223160 A1* | 8/2015 | Ho ................... H04W 72/0453 370/338 |
| 2016/0112944 A1 | 4/2016 | Zhou et al. |
| 2017/0311292 A1 | 10/2017 | Choi et al. |
| 2018/0035327 A1 | 2/2018 | Huang et al. |
| 2019/0132848 A1* | 5/2019 | Ansley ............ H04W 28/0252 |
| 2019/0215884 A1* | 7/2019 | Patil .................. H04W 74/006 |

OTHER PUBLICATIONS

U.S. Appl. No. 16/460,169, filed Jul. 2, 2019, Cisco Technology, Inc.

* cited by examiner

*Primary Examiner* — Kodzovi Acolatse
*Assistant Examiner* — Abdeltif Ajid
(74) *Attorney, Agent, or Firm* — Behmke Innovation Group LLC; Kenneth J. Heywood; Jonathon P. Western

(57) ABSTRACT

In one embodiment, a supervisory device for a wireless network classifies each client of a set of access points in the wireless network as either an Internet of Things (IoT) device or a non-IoT device. The supervisory device selects, for each of the access points in the set, a channel width based on the classifications of its clients. The supervisory device assigns, for each of the access points in the set, one or more wireless channels for use by that access point, based on the selected channel width for that access point. The supervisory device instructs the access points in the set to use their assigned channels to communicate with their clients.

20 Claims, 9 Drawing Sheets

SMART CHANNEL SELECTION FOR LOW BANDWIDTH IOT CLIENTS

TECHNICAL FIELD

The present disclosure relates generally to computer networks, and, more particularly, smart channel selection for low bandwidth Internet of Things (IoT) clients.

BACKGROUND

The Internet of Things, or "IoT" for short, represents an evolution of computer networks that seeks to connect many everyday objects to the Internet. Notably, there has been a recent proliferation of "smart" devices that are Internet-capable such as thermostats, lighting, televisions, cameras, and the like. In many implementations, these devices may also communicate with one another. For example, an IoT motion sensor may communicate with one or more smart lightbulbs, to actuate the lighting in a room, when a person enters the room.

With the proliferation of IoT devices to every walk of life, wireless networks are becoming inundated with more and more clients. Even with the relatively recent extension of wireless networking from the 2.4 GHz band into the 5 GHz band, the rapid growth of the number of IoT devices on many networks has led to some concerns over the effective utilization of the shared radio spectrum. Indeed, there are only so many channels available for use by the various wireless devices in a network. In addition, weather radar and certain military applications are given priority on certain channels in the 5 GHz band, meaning that devices operating on these channels must switch off of these channels, if they detect use of the channel by weather radar, etc. This can further constrain the set of channels for use in a wireless network.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
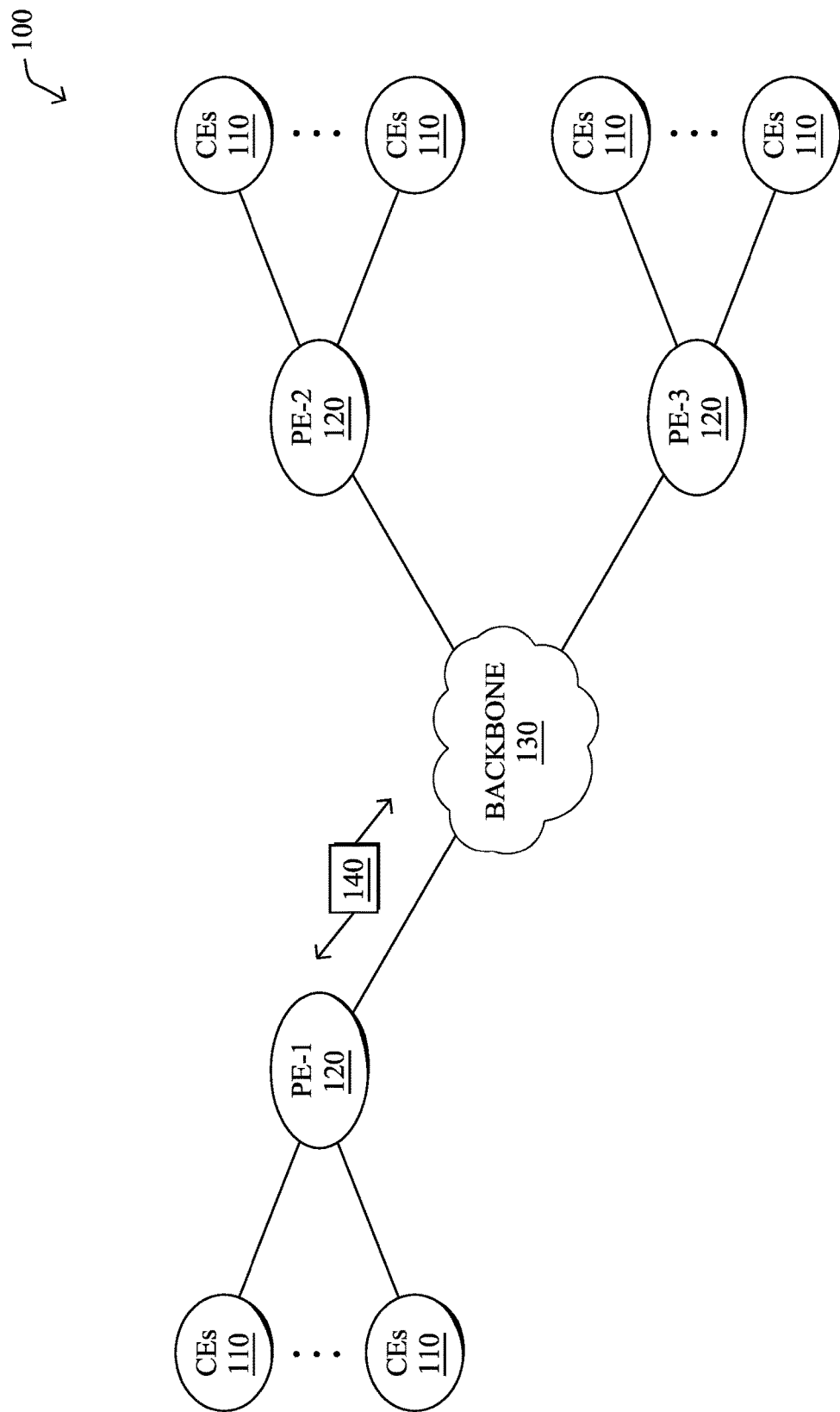
FIGS. 1A-1B illustrate an example communication network.

According to one or more embodiments of the disclosure, a supervisory device for a wireless network classifies each client of a set of access points in the wireless network as either an Internet of Things (IoT) device or a non-IoT device. The supervisory device selects, for each of the access points in the set, a channel width based on the classifications of its clients. The supervisory device assigns, for each of the access points in the set, one or more wireless channels for use by that access point, based on the selected channel width for that access point. The supervisory device instructs the access points in the set to use their assigned channels to communicate with their clients.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
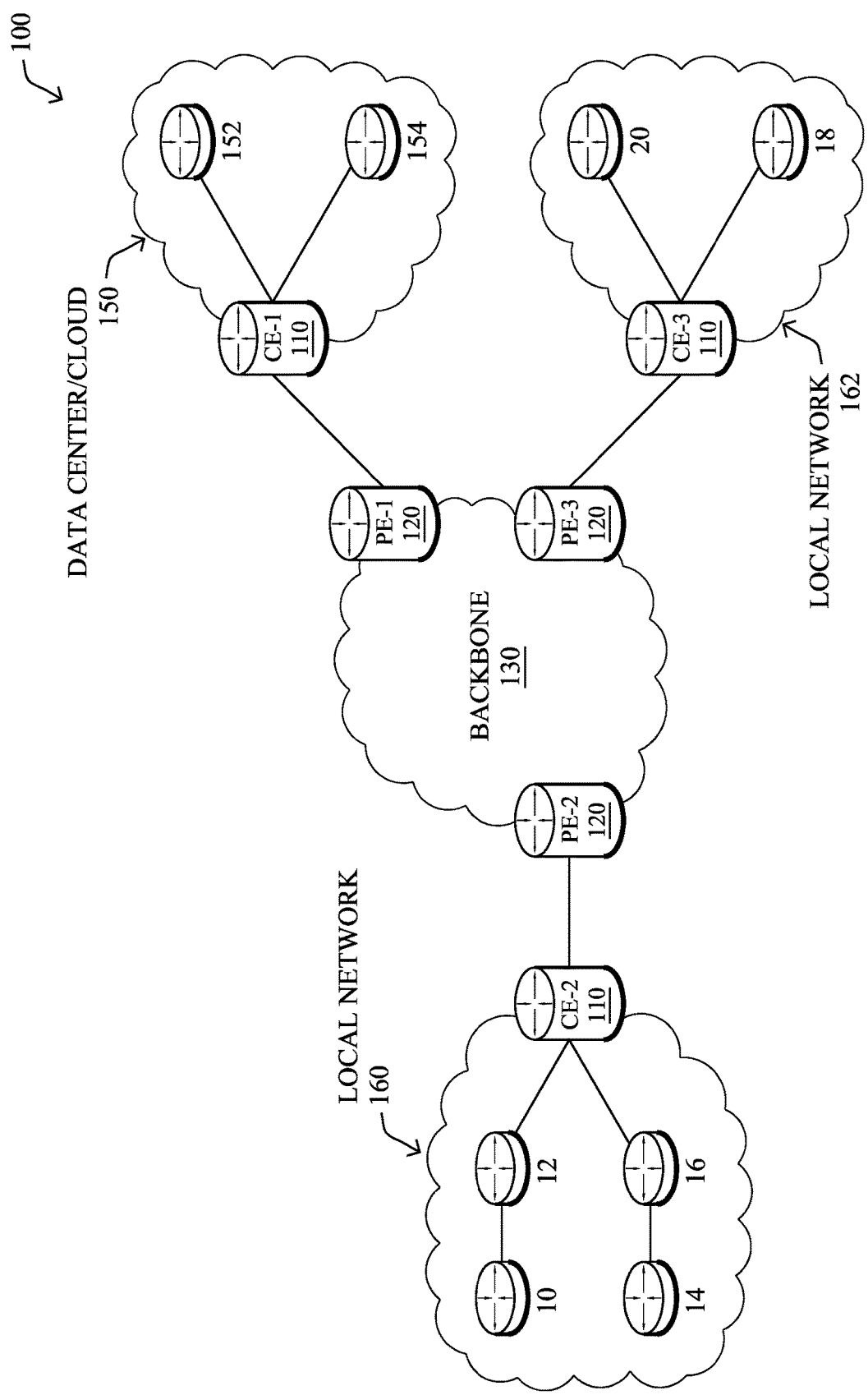

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
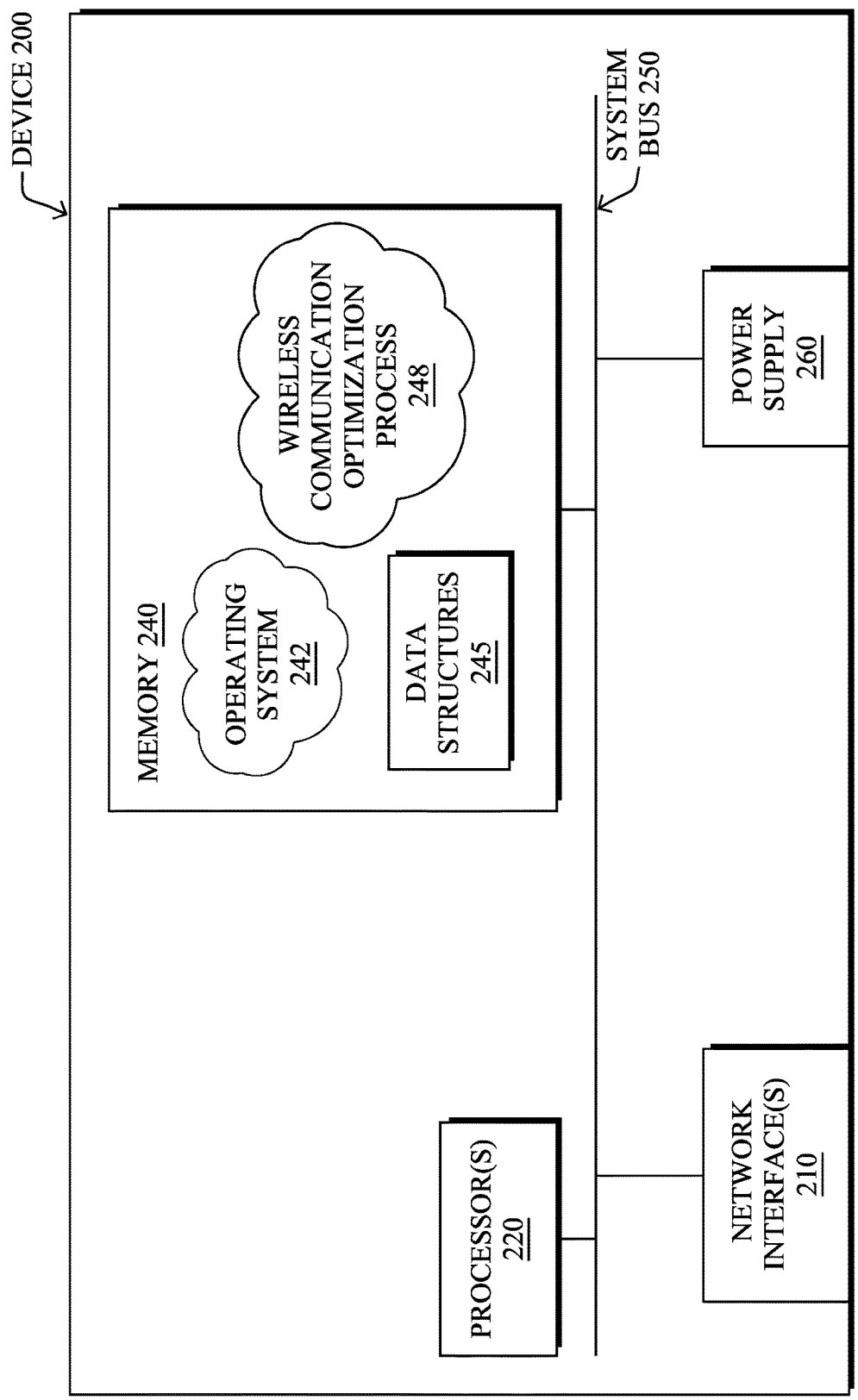
FIG. 2 illustrates an example network device/node.

FIG. 2 is a schematic block diagram of an example computing device/node 200 that may be used with one or more embodiments described herein e.g., as any of the devices shown in FIG. 1 above or any of the devices described further below. The device may comprise one or more network interfaces 210 (e.g., wired, wireless, cellular, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network 100. The network interfaces may be configured to transmit and/or receive data using a variety of different communication protocols. Note, further, that the nodes may have two or more different types of network connections 210, e.g., wireless and wired/physical connections, and that the view herein is merely for illustration.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise an illustrative wireless communication optimization process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Figure 3:
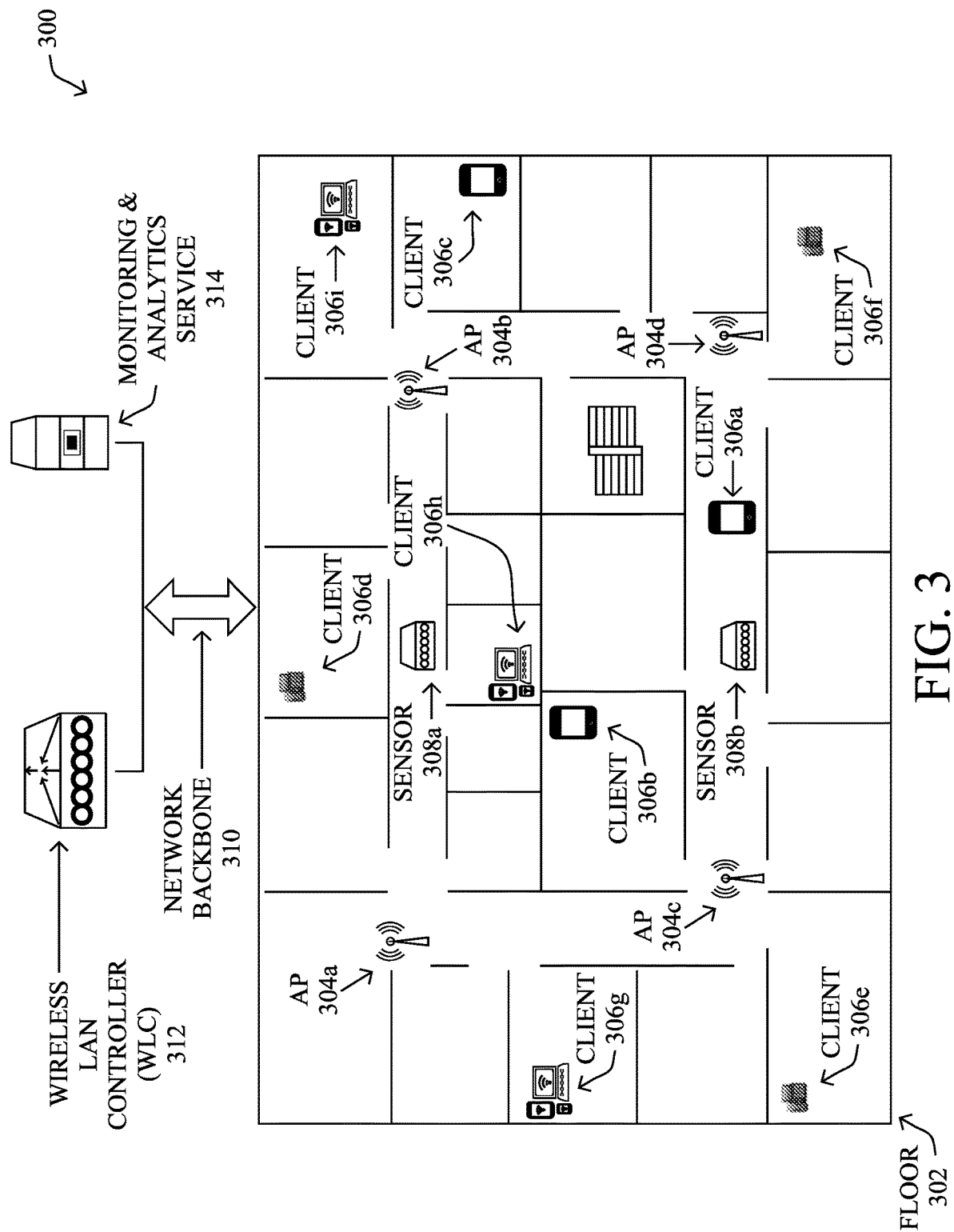
FIG. 3 illustrates an example wireless network.

FIG. 3 illustrates an example wireless network 300, according to various embodiments. Wireless network 300 may be deployed to a physical location, such as floor 302 shown, and may include various infrastructure devices. These infrastructure devices may include, for example, one or more access points (APs) 304 that provide wireless connectivity to the various wireless clients 306 distributed throughout the location. For illustrative purposes, APs 304a-304d and clients 306a-306i are depicted in FIG. 3. However, as would be appreciated, a wireless network deployment may include any number of APs and clients.

A network backbone 310 may interconnect APs 304 and provide a connection between APs 304 and any number of supervisory devices or services that provide control over APs 304. For example, as shown, a wireless LAN controller (WLC) 312 may control some or all of APs 304a-404d, by setting their control parameters (e.g., max number of attached clients, channels used, wireless modes, etc.). Another supervisory service that oversees wireless network 300 may be a monitoring and analytics service 314 that measures and monitors the performance of wireless network 300 and, if so configured, may also adjust the operation of wireless network 300 based on the monitored performance (e.g., via WLC 312, etc.). Note that service 314 may be implemented directly on WLC 312 or may operate in conjunction therewith, in various implementations.

Network backbone 310 may further provide connectivity between the infrastructure of the local network and a larger network, such as the Internet, a Multiprotocol Label Switching (MPLS) network, or the like. Accordingly, WLC 312 and/or monitoring and analytics service 314 may be located on the same local network as APs 304 or, alternatively, may be located remotely, such as in a remote datacenter, in the cloud, etc. To provide such connectivity, network backbone 310 may include any number of wired connections (e.g., Ethernet, optical, etc.) and/or wireless connections (e.g., cellular, etc.), as well as any number of networking devices (e.g., routers, switches, etc.).

In some embodiments, wireless network 300 may also include any number of wireless network sensors 308, such as sensors 308a-308b shown. In general, "wireless network sensors" are specialized devices that are able to act as wireless clients and perform testing on wireless network 300 and are not to be confused with other forms of sensors that may be distributed throughout a wireless network, such as motion sensors, temperature sensors, etc. In some cases, an AP 304 can also act as a wireless network sensor, by emulating a client in the network for purposes of testing communications with other APs. Thus, emulation points in network 300 may include dedicated wireless network sensors 308 and/or APs 304, if so configured.

During operation, the purpose of an emulation point in network 300 is to act as a wireless client and perform tests that include connectivity, performance, and/or negative scenarios, and report back on the network behavior to monitoring and analytics service 314. In turn, service 314 may perform analytics on the obtained performance metrics, to identify potential network issues before they are reported by actual clients. If such an issue is identified, service 314 can then take corrective measures, such as changing the operation of network 300 and/or reporting the potential issue to a network administrator or technician.

The types and configurations of clients 304 in network 300 can vary greatly. For example, clients 306a-306c may be mobile phones, clients 306d-306f may be office phones, and clients 306g-306i may be computers, all of which may be of different makes, models, and/or configurations (e.g., firmware or software versions, chipsets, etc.). Consequently, each of clients 306a-306i may behave very differently in wireless network 300 from both RF and traffic perspectives.

Dynamic Frequency Selection (DFS) is a mechanism that represents a compromise in allowing consumer devices to share the 5 GHz spectrum with radar systems, some of the Unlicensed National Information Infrastructure (U-NII) bands, etc. Under DFS, a consumer device operating on a DFS band should monitor the band, prior to transmitting on it, for use by radar or the like. If the band is already in use, the device should dynamically select a different channel/frequency to use. Similarly, if the device detects any use while using the band, it should immediately stop transmitting on that channel and move to different channel.

By way of example, in North America, the 5 GHz Wi-Fi channels include the following:

TABLE 1

| Wi-Fi Channel | DFS Channel? |
|---|---|
| 36 | No |
| 40 | No |
| 44 | No |
| 48 | No |
| 52 | Yes |
| 56 | Yes |
| 60 | Yes |
| 64 | Yes |
| ... | ... |
| 100 | Yes |
| 104 | Yes |
| 108 | Yes |
| 112 | Yes |
| 116 | Yes |
| 120 | Yes |
| 124 | Yes |
| 128 | Yes |
| 132 | Yes |
| 136 | Yes |
| 140 | Yes |
| 144 | Yes |
| ... | ... |
| 149 | No |
| 153 | No |
| 157 | No |
| 161 | No |
| 165 | No |

Another consideration when selecting a channel plan for wireless access points in a network is the channel width (bandwidth). For example, each channel in the 2.4 GHz and 5 GHz spectrums may have an associated 20 MHz channel width. Larger channel widths can be achieved by operating on multiple, adjacent channels. For example, operating on channels 36 and 40 allows for a channel width of 40 MHz. Similarly, four channels can be used for a channel width of 80 MHz and eight channels can be used for a channel width of 160 MHz. On 2.4 GHz, access points typically use a 20 MHz channel width and a 40 MHz channel width on 5 GHz.

As noted above, the "Internet of Things" (IoT) represents the possibility of connecting sensors, actuators, and everyday objects to the Internet. This can lead to a significant change in our daily lives in the way we live and interact with the devices, such as home appliances, smart meters, security systems, etc. Thanks to rapid advances in underlying technologies, increased adoption of IoT is giving rise to dense deployments in wireless networks so much so that efficient utilization of shared radio frequency (RF) spectrum has become a primary concern in Wi-Fi. This is especially true since there are only a limited number of channels available for a given channel width, under a particular spectrum.

In other words, the vast majority of IoT deployments are expected to be "brown-field," meaning that IoT devices will compete with traditional, more capable computing devices for RF spectrum use. For example, high capacity, high efficiency (HE) stations like smartphones and laptops will now have to share Wi-Fi channels with lower capability IoT devices such as door sensors, temperature sensors, and the like. Given that the quality of service (QoS) and channel width requirements for IoT traffic is markedly different than those of HE stations, there is a growing need for a service that can compute an efficient channel plan for all of the APs in a Wireless Local Area Network (WLAN) such that the QoS constraints of all classes of devices are met or exceeded.

Smart Channel Selection for Low Bandwidth IoT Clients

The techniques herein allow a supervisory device for a wireless network to adaptively assign channels and channel widths to radios/APs in the presence of IoT traffic. Particular attention is given to co-existence scenarios between IoT clients and HE clients, which may have very different QoS requirements. In some aspects, adaptive bias values can be used to bias channel and/or channel width assignments, based on classifications of the clients as being either IoT or non-IoT devices. In further aspects, approaches such as reverse band steering can be leveraged, to favor use of the 5 GHz spectrum by HE clients. The net result is improved wireless determinism, along with better channel planning, such that QoS requirements of both IoT and HE clients are met.

Specifically, according to one or more embodiments of the disclosure as described in detail below, a supervisory device for a wireless network classifies each client of a set of access points in the wireless network as either an Internet of Things (IoT) device or a non-IoT device. The supervisory device selects, for each of the access points in the set, a channel width based on the classifications of its clients. The supervisory device assigns, for each of the access points in the set, one or more wireless channels for use by that access point, based on the selected channel width for that access point. The supervisory device instructs the access points in the set to use their assigned channels to communicate with their clients.

Illustratively, the techniques described herein may be performed by hardware, software, and/or firmware, such as in accordance with the wireless communication optimization process 248, which may include computer executable instructions executed by the processor 220 (or independent processor of interfaces 210) to perform functions relating to the techniques described herein.

Operationally, supervisory services for a wireless network, such as Radio Resource Management (RRM) by Cisco Systems, Inc., continually analyze the existing radio frequency (RF) environs, automatically adjusting the power and channel configurations of each AP, to help mitigate unfavorable effects (e.g., co-channel interference, signal coverage problems, etc.). For example, in FIG. 3, WLC 312 may implement RRM (e.g., a monitoring and analytics service 314), to determine the channel plans for the various APs 304 located throughout wireless network 300. Such a supervisory service reduces the need to perform exhaustive site surveys, increases system capacity and provides automated self-healing functionality to compensate for RF dead zones and AP failures.

However, the increased adoption of the IoT is giving rise to dense wireless deployments in which IoT devices far outnumber their high capacity, high efficiency (HE) counterparts. Unlike wireless traffic from HE devices, traffic from IoT devices can be broadly viewed as throughput and delay tolerant, "elastic" traffic with low QoS requirements. This presents new challenge to RRM and similar supervisory services, as a channel plan must be computed for all RF neighborhoods in a WLAN with only a handful of clean, wide-band channels available to satisfy the various QoS requirements for the different classes of traffic in the network.

According to various embodiments, a supervisory service for a wireless network may employ either or both of the following mechanisms:

Dynamic Channel Assignment (DCA)—this mechanism assigns channels to APs

Dynamic Bandwidth Selection (DBS)—this mechanism assigns bandwidths/channel widths to APs, to meet the different QoS demands of the clients in the wireless network.

With respect to DCA, the supervisory service may employ an RF cost metric that quantifies how 'good' the RF conditions are on the Wi-Fi channels. For example, the service may compute the RF cost metric for a channel based on the RF statistics of neighboring and rogue APs, including their interference from each other, their channel widths, and their traffic loads. In addition, the service may also take into account non-WiFi interference and noise levels in the area, when computing the RF cost metric for a channel. For example, the RF cost metric may be such that the smaller its value, the better the RF conditions are on the channel for use. Accordingly, the DCA mechanism may seek to assign APs to channels with the minimum RF cost metric and performed periodically, to account for changing RF conditions.

Since typical DCA approaches seek to assign channels with minimum RF cost metrics, they are predisposed to select channels that meet high QoS and data rate requirements. However, this approach also ignores the fact that IoT traffic is much more throughput and delay tolerant, with low data rate and QoS requirements. The result is that a DCA mechanism may compute sub-optimal channel plans in "brown-field" deployments in which a large number of IoT devices are expected to share Wi-Fi channels with HE stations, such as smartphones and laptops.

Figure 4A:
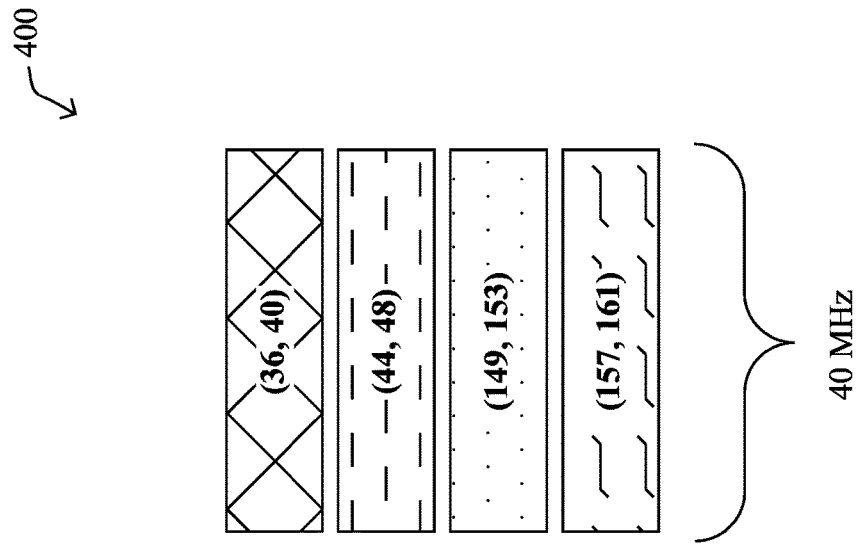
FIGS. 4A-4D illustrate examples of channel and channel width assignments to wireless access points.
Figure 4A:
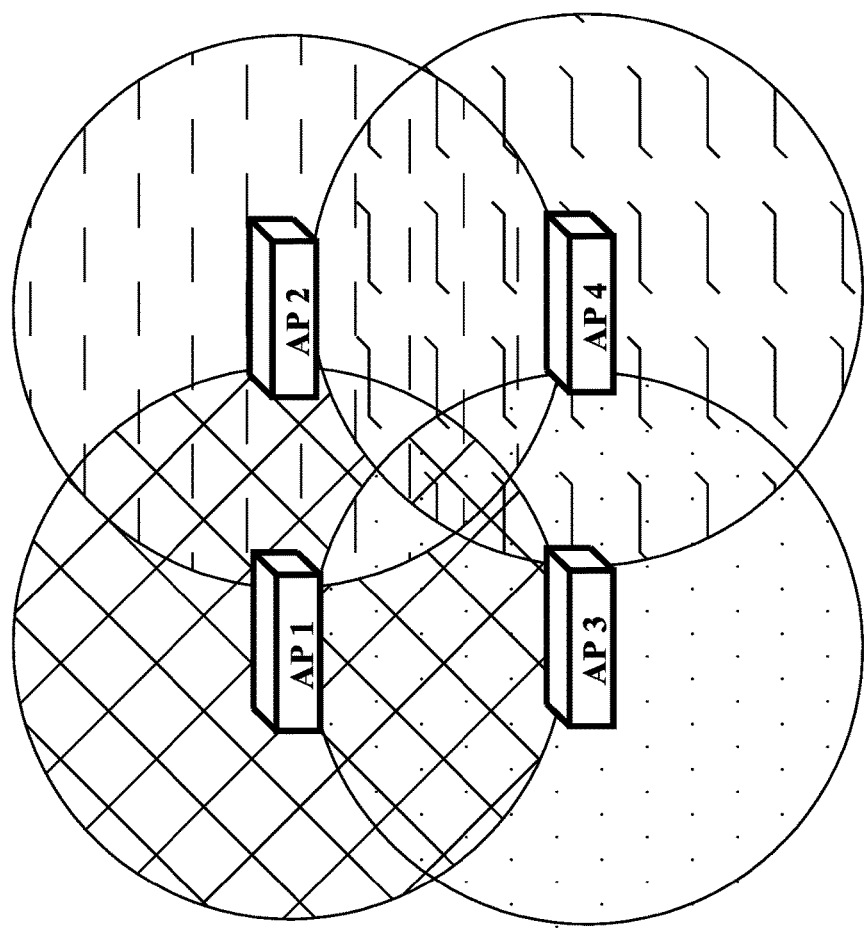

FIG. 4A illustrates an example set 400 of APs 1-4 that may be located in a wireless network. For purposes of illustration, assume that APs 1-4 are operating in the 5 GHz spectrum, with AP 1 serving IoT devices and APs 2-4 handling HE clients. If DFS is turned off and the remaining channels have good metrics, a typical DCA mechanism will assign 40 MHz wide channels to each of APs 1-4. More specifically, the DCA mechanism may assign channels 36, 40 to AP 1, channels 44, 48 to AP 2, channels 149, 153 to AP 3, and channels 157, 161 to AP 4.

Figure 4B:
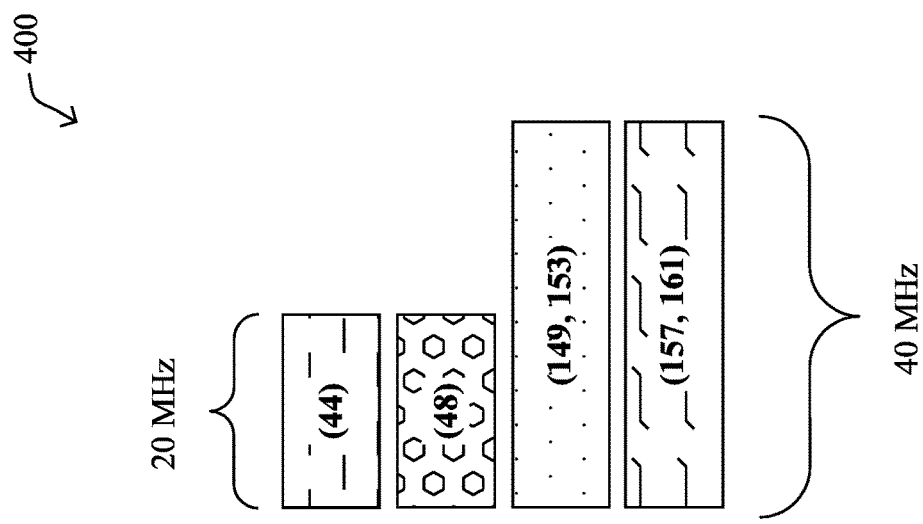
Figure 4B:
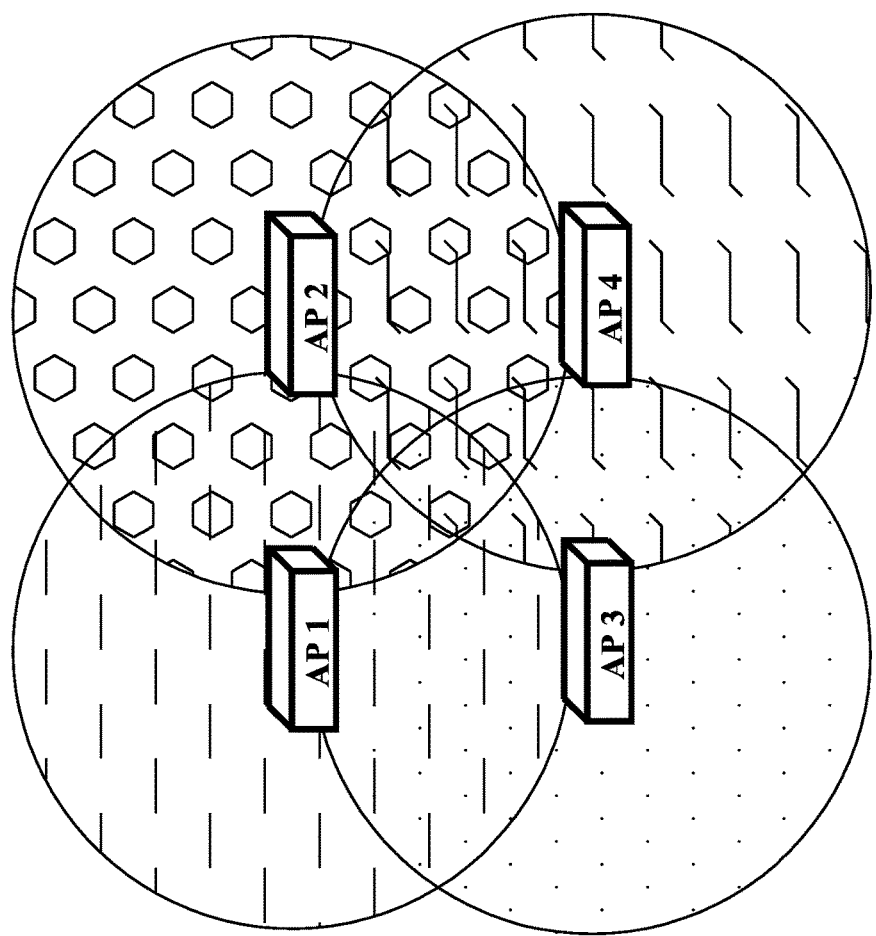

Assume now that RF conditions on channels 36, 40 used by AP 1 deteriorate. In such a case, as shown in FIG. 4B, DCA may attempt to move AP 1 to a different channel, even though the deteriorated RF conditions on channels 36, 40 may still be sufficient to satisfy the low QoS requirements of its IoT clients. Since all of the possible 40 MHz channels have already been assigned to the neighbors of AP 1, and two neighboring APs sharing the same channel drives-up co-channel interference resulting in higher RF cost metrics, a typical DCA mechanism will reduce the bandwidth of a neighboring AP. For example, in addition to moving AP 1 to channel 44 and a channel width of 20 MHz, the DCA mechanism may also move AP 2 to channel 48 and also reduce its channel width to 20 MHz. As a result, the HE clients of AP 2 are forced into using only half of the previously available bandwidth, even if the IoT clients of AP 1 would be perfectly fine with the deteriorated RF conditions on channels 36, 40.

According to various embodiments, the techniques herein propose biasing the DCA selection mechanism to also take into account the types of clients of an AP. For example, the RF cost metrics of the channels may be considered acceptable, as long as legacy (CCK/OFDM) rates and QoS requirements of the clients can be sustained. More specifically, the DCA mechanism may apply this bias only to radios that predominantly handle IoT traffic.

Various approaches can be taken to classify the clients of an AP as either IoT devices or non-IoT/HE devices. In some embodiments, the clients themselves may identify themselves, accordingly. For example, a client may announce itself to be a 20 MHz client or announce itself as being of a particular device type via a manufacturer usage description (MUD), as specified in the Internet Engineering Task Force (IETF) draft entitled, "Manufacturer Usage Description Specification." In further embodiments, the classification of a client as IoT or non-IoT can be achieved through profiling the traffic of the client. For example, the traffic destinations of the clients, the payloads of the traffic, etc., can offer clues as to the client type.

In various embodiments, APs serving primarily IoT clients may be biased towards use of smaller channel widths, such as 20 MHz channel widths. Thus, even if an 802.11n based temperature sensor is capable of using 40 MHz channel widths, if it is classified as an IoT device by the supervisory service, it may be biased towards using 20 MHz channel widths. Conversely, if a 40 MHz capable laptop is classified as a non-IoT device, it will not be biased towards using only a 20 MHz channel width.

The application of a bias towards smaller channel widths may be based on the number or percentage of IoT clients of a radio or AP exceeding a predefined threshold. Additionally, the applied bias may be 'adaptive' in nature, meaning that the amount of bias may also be based on factors like concentration of IoT devices, their QoS, their data rate requirements, etc.

Introducing the aforementioned bias increases the number of choices available for a DCA mechanism while computing a channel plan involving IoT traffic. For example, consider again the example described with respect to FIG. 4A. Even though the RF metric for channels 36, 40 have deteriorated, the channel quality may still be good enough to satisfy the QoS requirements of the IoT. Thus, by biasing the decision, the supervisory service may determine that no change to the channel plan is needed. By doing so, the HE clients of AP 2 can remain unaffected.

As would be appreciated, the adaptive DCA mechanism proposed herein offers the following benefits:
  IoT serving radios do not switch channel immediately due to slight degradation in the channel quality. As long as legacy (CCK/OFDM) rates can be sustained, the QoS requirement of IoT devices can be met easily. Hence, DCA now avoids changing channels on such radios increasing determinism in wireless.
  Keep cleaner channels for HE clients—With the knowledge that radios with IoT devices can operate even on slightly degraded channels, the supervisory service can now assign cleaner channels to radios with HE clients so that their QoS requirements can be met with higher data rates.

Working hand in hand with a DCA mechanism may also be a DBS mechanism that allows the supervisory service to assign bandwidth/channel widths to APs that have associated clients that could benefit from the additional bandwidth. The approach is dynamic and, since it is based on analysis of what the client capabilities are and what they are doing, allows the supervisory service to 'right size' the network channels. It is important to note that DBS and DCA can work in conjunction with one another, to find the best channel and bandwidth choice for each AP. Indeed, a DBS mechanism can help steer the channel selection by the DCA mechanism towards channel assignments that are in line with the needs of the clients. In other words, the DBS mechanism may provide yet another bias factor when developing the channel plan for the network. This additional layer of bias may, for example, consist of a bias for various categories like 80 MHz, 40 MHz, 20 MHz, voice and video. If a bias is added to any category, this means that the category is less likely to be selected.

Figure 4C:
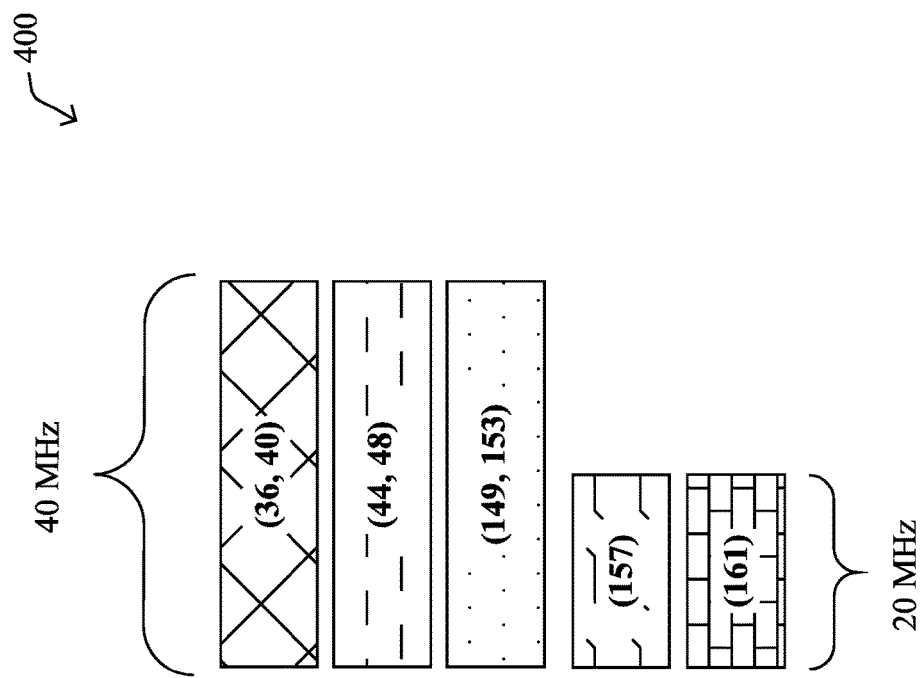
Figure 4C:
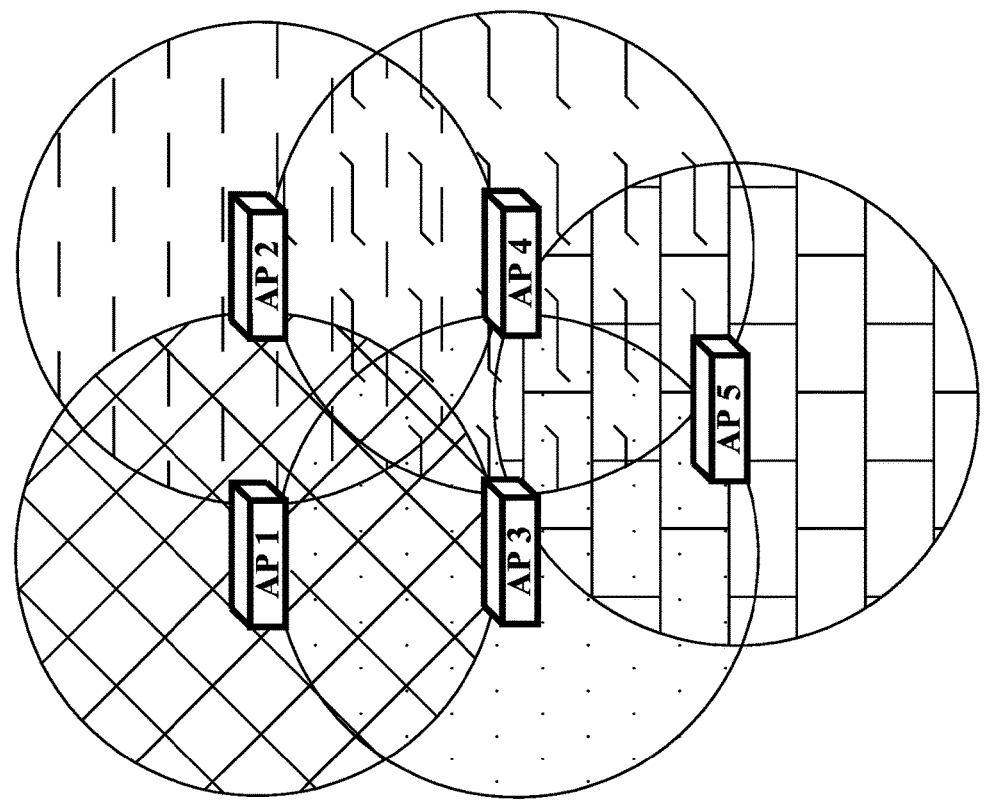

To illustrate the operations of a DBS mechanism, consider the example shown in FIG. 4C. Continuing the example of FIG. 4A again, assume that AP 1 has a large number or percentage of IoT clients. Using the client-type bias proposed herein, AP 1 may remain on channels 36, 40 (e.g., a 40 MHz channel width), even if its RF conditions have degraded somewhat. However, now also assume that a fifth AP, AP 5 is added to the network that will primarily serve non-IoT/HE clients.

Because AP 5 shown also needs a channel, and since the supervisory service has already assigned all of the possible 40 MHz channels to the neighborhood, the supervisory service must 'make room' for AP 5 in the channel plan. To do so, the DCA mechanism of the supervisory service will typically reduce the bandwidth of a neighboring AP. For example, the service may reduce the channel width of AP 4 by assigning only channel 157 to it, thereby freeing up channel 161 for use by AP 5. This result is also unsatisfactory, if either of AP 4 or AP 5 serves non-IoT/HE clients that require more bandwidth.

According to various embodiments, the DBS mechanism of the supervisory service may bias channel and channel width assignments for radios or APs towards 20 MHz channel widths, if the clients are IoT devices. Notably, as shown in FIG. 4C, the addition of AP 5 to the channel plan by reducing the channel width of AP 4 does not take into account the fact that AP 1 is primarily serving IoT clients that do not require the additional bandwidth afforded by a 40 MHz channel width.

Figure 4D:
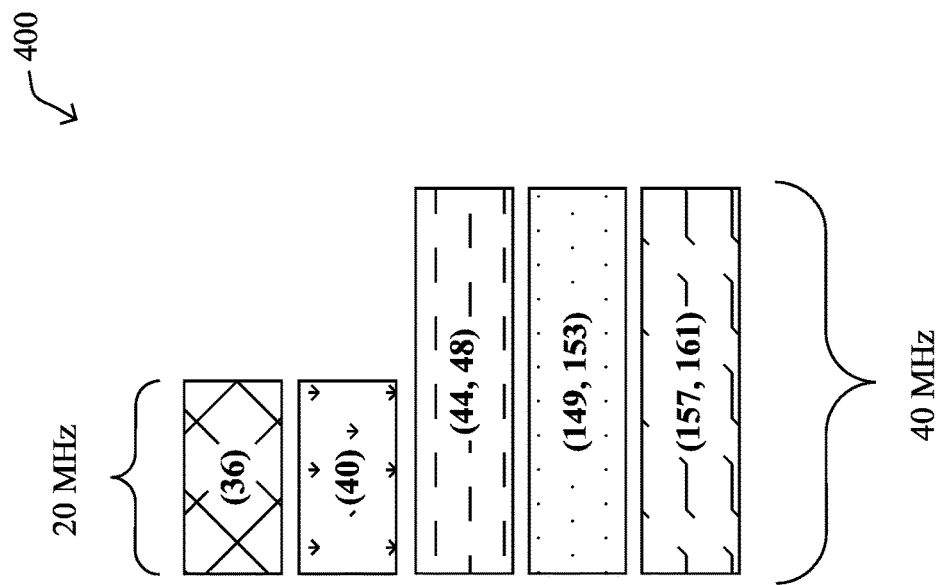
Figure 4D:
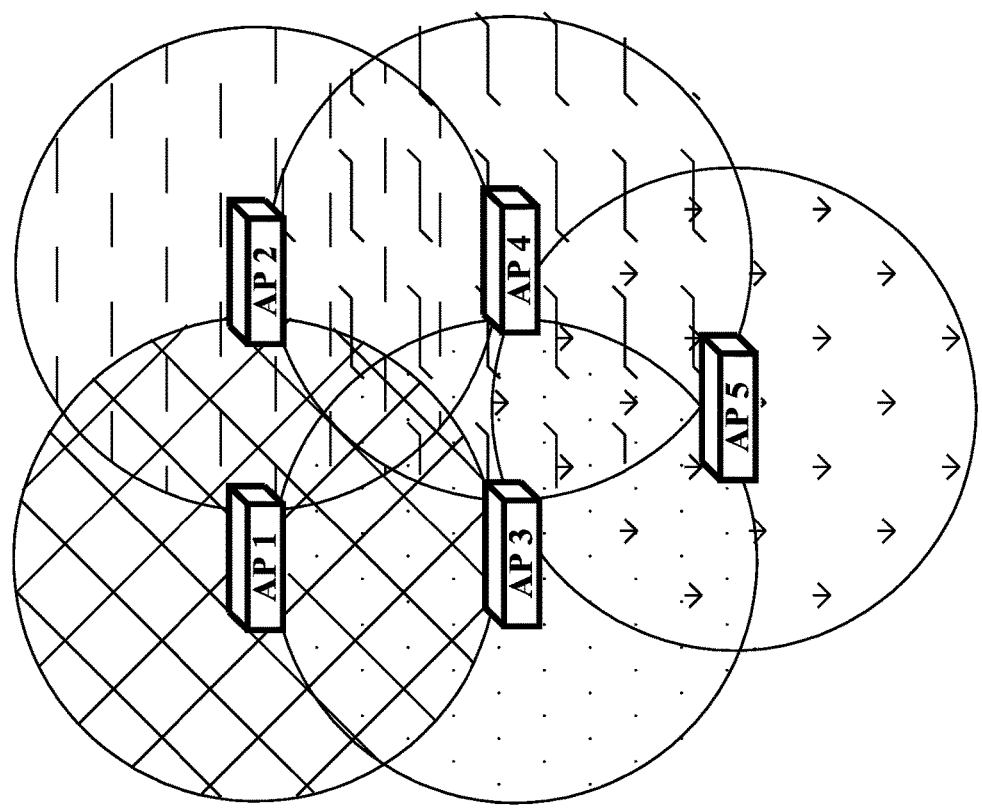

As shown in FIG. 4D, by categorizing IoT devices as 20 MHz devices for a DBS mechanism, the supervisory service may also take into account the client types (e.g., IoT vs. non-IoT/HE), when computing an updated channel plan that includes AP 5. Such an active labeling of clients leads DBS to bias a radio towards using a 20 MHz channel width when a large portion of its clients are labelled IoT, even if those clients are capable of supporting wider bandwidths. Thus, rather than downgrade the channel width of AP 4 to account for AP 5, the supervisory service may determine that the channel width of AP 1 can be downgraded, instead, based on AP 1 primarily service IoT clients. Thus, AP 1 may be assigned channel 36 and AP 5 may be assigned channel 40. In doing so, the non-IoT clients of AP 4 can remain unaffected, under the assumption that the IoT clients of AP 1 are more resilient to using only a 20 MHz channel width.

As would be appreciated, biasing a DBS mechanism towards 20 MHz for IoT clients has the following advantages:

IoT serving radios are inclined to be 20 MHz channels. This is a clear departure from existing approaches that focus on the capabilities of the client (e.g., does the client support 40 MHz) rather than the actual QoS requirements of its traffic. Since legacy rates (e.g., CCK/OFDM) can be sustained on 20 MHz, the DBS mechanism is likely to recommend radios/APs with a large number or percentage of IoT clients to use 20 MHz wide channels.

Non-IoT/HE clients will favor larger channel widths. With the knowledge that radios with IoT devices can operate on 20 MHz wide channels, the supervisory device can now assign wider channels to radios/APs with non-IoT clients, so that their QoS requirements can be met with higher data rates.

In some embodiments, the biasing techniques introduced herein further allow a supervisory service for a wireless network to take the needs of the IoT clients into consideration from a holistic standpoint. For example, in the presence of many IoT clients, the supervisory service may also have neighboring APs refine their channels by having a few radios use 20 MHz channel widths and the remaining radios use wider channel widths. In turn, the APs can then steer the IoT devices to the 20 MHz radios using probe suppression, 802.11k or 802.11v messages, or the like, while keeping the non-IoT/HE clients on the radios with wider channel widths.

In further embodiments, reverse band steering can also be used to help implement the biasing approaches herein. For example, the supervisory service may attempt to steer the IoT clients towards using channels in the 2.4 GHz spectrum, reserving use of the 5 GHz spectrum for the non-IoT/HE clients. Since IoT traffic typically has low QoS requirements, they can be satisfied on the 2.4 GHz spectrum, thereby allowing the non-IoT/HE clients to benefit from wider channel and higher rates available on the 5 GHz spectrum. This can be achieved through probe suppression, use of an 802.11k dual band neighbor list, or even a dual band-aware channel switch announcement. Probe suppression, for example, may entail the AP ignoring probes from the IoT clients on the 5 GHz spectrum and responding only to probes on the 2.4 GHz spectrum. The supervisory service may further adjust cell sizes with the knowledge that RF channel communications between the client and the radio/AP will be exchanged at the legacy (CCK/OFDM) rates. This reduces co-channel interference further improving the RF cost metrics for neighboring radios.

Figure 5:
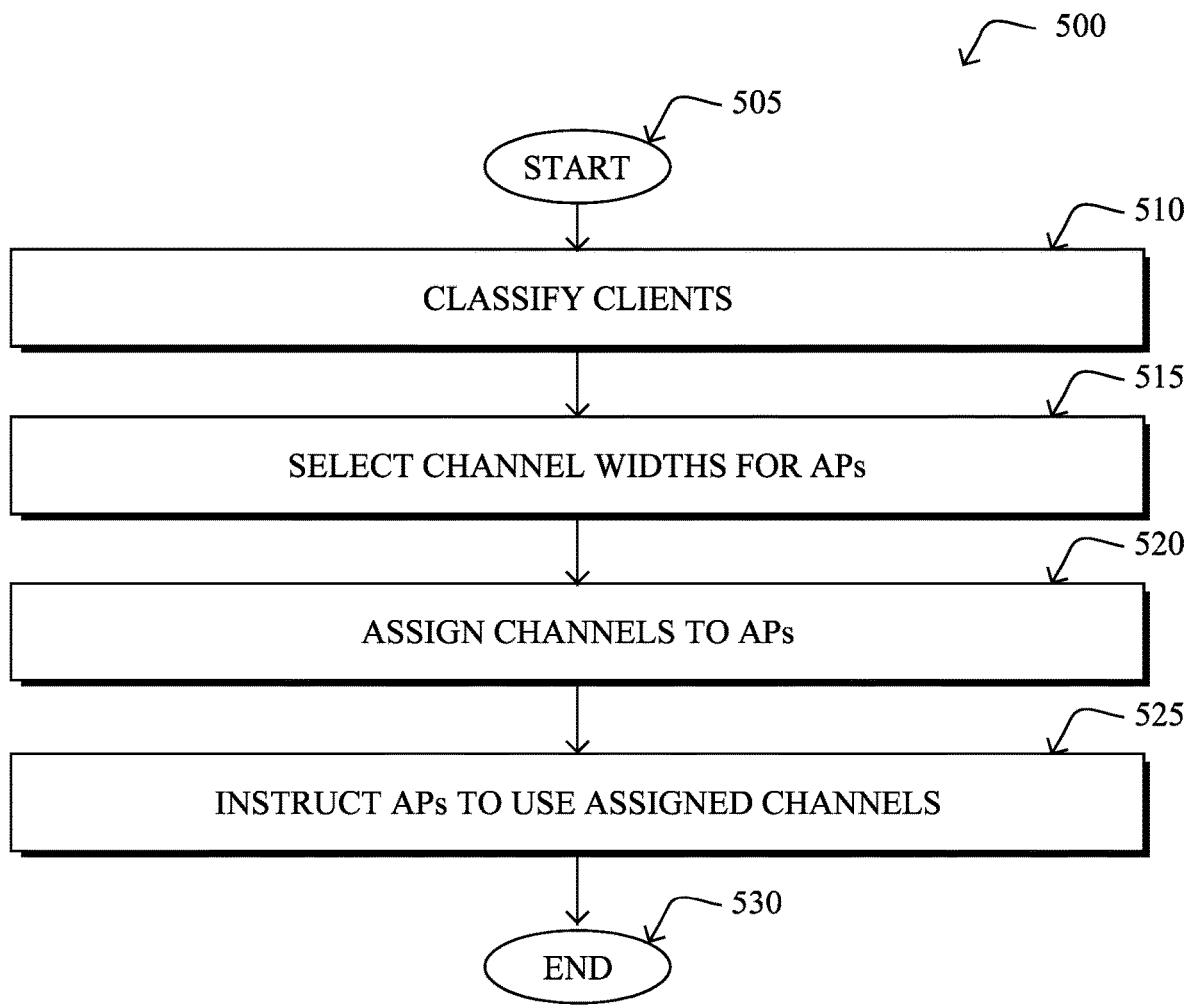
FIG. 5 illustrates an example simplified procedure for smart channel selection for low bandwidth Internet of Things (IoT) clients.

FIG. 5 illustrates an example simplified procedure for smart channel selection for low bandwidth Internet of Things (IoT) clients in a network, in accordance with one or more embodiments described herein. For example, a non-generic, specifically configured device (e.g., device 200) may perform procedure 500 by executing stored instructions (e.g., process 248), to provide a supervisory service to a wireless network. The procedure 500 may start at step 505, and continues to step 510, where, as described in greater detail above, the supervisory device may classify each client of a set of access points (APs) in the wireless network as either an IoT device or a non-IoT device. For example, the service may leverage self-identifications by the clients themselves (e.g., MUD profiles, etc.) and/or device profiling approaches, to distinguish between the two categories of clients.

At step 515, as detailed above, the supervisory device may select, for each of the access points in the set, a channel width based on the classifications of its clients. In general, this channel width assignment may be such that it favors assigning smaller channel widths to APs serving a threshold number or percentage of IoT clients. For example, the supervisory device may bias the selection towards a 20 megahertz (MHz) channel width for a given AP, based on a number of percentage of clients of the access point classified as IoT devices exceeding a predefined threshold. Such a selection may also take into account the QoS or date rate requirements of the clients of that access point, in some cases.

At step 520, the supervisory device may assign, for each of the access points in the set, one or more wireless channels for use by that access point, based on the selected channel width for that access point, as described in greater detail above. For example, if the clients of one of the APs are primarily non-IoT/HE clients, the device may select a channel width of 40 MHz, 80 MHz, or 160 MHz for the AP and assign two, four, or eight channels to that AP, accordingly.

At step 525, as detailed above, the supervisory device may instruct the access points in the set to use their assigned channels to communicate with their clients. In some embodiments, the supervisory device may also instruct a particular one of the access points to steer its clients classified as IoT devices towards use of a 20 MHz channel width. For example, the AP may suppress probe responses from the IoT clients, use a channel switch announcement, or 802.11k dual band neighbor list, to steer the IoT clients towards using a 20 MHz channel width. This can even be done to steer the IoT clients towards using a channel in the 2.4 GHz band, instead of the 5 GHz band. Procedure 500 then ends at step 530.

It should be noted that while certain steps within procedure 500 may be optional as described above, the steps shown in FIG. 5 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, take into account the different needs of IoT clients versus other clients in a wireless network, when computing and implementing a channel plan for multiple APs in the network. In some aspects, APs serving IoT clients can favor using smaller channel widths (e.g., 20 MHz), thereby freeing up channels to support larger channel widths for non-IoT clients.

While there have been shown and described illustrative embodiments that provide for smart channel selection in a wireless network, it is to be understood that various other adaptations and modifications may be made within the spirit and scope of the embodiments herein. In addition, while certain protocols are shown, such as the various 802.11 protocols, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
    classifying, by a supervisory device for a wireless network, each client of a set of access points in the wireless network as either an Internet of Things (IoT) device or a non-IoT device;
    determining, by the supervisory device, whether a number or percentage of clients of each access point in the set that are classified as an IoT device exceeds a predefined threshold;
    selecting, by the supervisory device and for each of the access points in the set, a channel width based on the determination of whether the number or percentage of clients of each access point in the set that are classified as an IoT device exceeds the predefined threshold;
    assigning, by the supervisory device and for each of the access points in the set, one or more wireless channels for use by that access point, based on the selected channel width for that access point; and
    instructing, by the supervisory device, the access points in the set to use their assigned channels to communicate with their clients.

2. The method as in claim 1, wherein selecting, for each of the access points in the set, a channel width based on the classifications of its clients comprises:
    biasing the selection towards a 20 megahertz (MHz) channel width when the number or percentage of clients of each access point in the set that are classified as an IoT device exceeds the predefined threshold.

3. The method as in claim 2, wherein the selection of a channel width for one of the access points is biased towards a 20 megahertz (MHz) channel width, based further on quality of service (QoS) or data rate requirements of the clients of that access point.

4. The method as in claim 1, wherein instructing the access points in the set to use their assigned channels to communicate with their clients comprises:
    instructing a particular one of the access points to steer its clients classified as IoT devices towards use of a 20 megahertz (MHz) channel width.

5. The method as in claim 4, wherein the access point steers its clients classified as IoT devices towards use of a 20 MHz channel width by suppressing probe responses to its clients classified as IoT devices.

6. The method as in claim 4, wherein the access point steers its clients classified as IoT devices towards use of a 20 MHz channel width via a channel switch announcement or 802.11k dual band neighbor list.

7. The method as in claim 1, further comprising:
    instructing the particular access point to steer its clients classified as IoT devices towards using a channel in the 2.4 gigahertz (GHz) band.

8. An apparatus, comprising:
    one or more network interfaces to communicate with a network;
    a processor coupled to the network interfaces and configured to execute one or more processes; and
    a memory configured to store a process executable by the processor, the process when executed configured to:
        classify each client of a set of access points in the wireless network as either an Internet of Things (IoT) device or a non-IoT device;
        determine whether a number or percentage of clients of each access point in the set that are classified as an IoT device exceeds a predefined threshold;
        select, for each of the access points in the set, a channel width based on the determination of whether the number or percentage of clients of each access point in the set that are classified as an IoT device exceeds the predefined threshold;
        assign, for each of the access points in the set, one or more wireless channels for use by that access point, based on the selected channel width for that access point; and
        instruct the access points in the set to use their assigned channels to communicate with their clients.

9. The apparatus as in claim 8, wherein the apparatus selects, for each of the access points in the set, a channel width based on the classifications of its clients by:
    biasing the selection towards a 20 megahertz (MHz) channel width when the number or percentage of clients of each access point in the set that are classified as an IoT device exceeds the predefined threshold.

10. The apparatus as in claim 9, wherein the selection of a channel width for one of the access points is biased towards a 20 megahertz (MHz) channel width, based further on quality of service (QoS) or data rate requirements of the clients of that access point.

11. The apparatus as in claim 8, wherein the apparatus instructs the access points in the set to use their assigned channels to communicate with their clients by:
instructing a particular one of the access points to steer its clients classified as IoT devices towards use of a 20 megahertz (MHz) channel width.

12. The apparatus as in claim 11, wherein the access point steers its clients classified as IoT devices towards use of a 20 MHz channel width by suppressing probe responses to its clients classified as IoT devices.

13. The apparatus as in claim 11, wherein the access point steers its clients classified as IoT devices towards use of a 20 MHz channel width via a channel switch announcement or 802.11k dual band neighbor list.

14. The apparatus as in claim 8, wherein the process when executed is further configured to:
instruct the particular access point to steer its clients classified as IoT devices towards using a channel in the 2.4 gigahertz (GHz) band.

15. A tangible, non-transitory, computer-readable medium storing program instructions that cause a supervisory service for a wireless network to execute a process comprising:
classifying, by the supervisory service for the wireless network, each client of a set of access points in the wireless network as either an Internet of Things (IoT) device or a non-IoT device;
determining, by the supervisory device, whether a number or percentage of clients of each access point in the set that are classified as an IoT device exceeds a predefined threshold;
selecting, by the supervisory device and for each of the access points in the set, a channel width based on the determination of whether the number or percentage of clients of each access point in the set that are classified as an IoT device exceeds the predefined threshold;
assigning, by the supervisory device and for each of the access points in the set, one or more wireless channels for use by that access point, based on the selected channel width for that access point; and
instructing, by the supervisory device, the access points in the set to use their assigned channels to communicate with their clients.

16. The computer-readable medium as in claim 15, wherein selecting, for each of the access points in the set, a channel width based on the classifications of its clients comprises:
biasing the selection towards a 20 megahertz (MHz) channel width when the number or percentage of clients of each access point in the set that are classified as an IoT device exceeds the predefined threshold.

17. The computer-readable medium as in claim 16, wherein the selection of a channel width for one of the access points is biased towards a 20 megahertz (MHz) channel width, based further on quality of service (QoS) or data rate requirements of the clients of that access point.

18. The computer-readable medium as in claim 15, wherein instructing the access points in the set to use their assigned channels to communicate with their clients comprises:
instructing a particular one of the access points to steer its clients classified as IoT devices towards use of a 20 megahertz (MHz) channel width.

19. The computer-readable medium as in claim 18, wherein the access point steers its clients classified as IoT devices towards use of a 20 MHz channel width by suppressing probe responses to its clients classified as IoT devices.

20. The computer-readable medium as in claim 18, wherein the access point steers its clients classified as IoT devices towards use of a 20 MHz channel width via a channel switch announcement or 802.11k dual band neighbor list.

\* \* \* \* \*